United States Patent [19]
Nakamura

[11] Patent Number: 5,626,364
[45] Date of Patent: May 6, 1997

[54] STEERING SYSTEM FOR VEHICLE

[75] Inventor: Kunihiro Nakamura, Nagoya, Japan

[73] Assignee: Mitsubishi Jidosha Kogyo Kabushiki Kaisha, Tokyo, Japan

[21] Appl. No.: 437,384

[22] Filed: May 9, 1995

[30] Foreign Application Priority Data

May 10, 1994 [JP] Japan .................................. 6-120644

[51] Int. Cl.$^6$ .................................................. B62D 1/19
[52] U.S. Cl. ........................................................ 280/777
[58] Field of Search ................................ 280/775, 777; 180/78; 74/492, 493

[56] References Cited

U.S. PATENT DOCUMENTS

| | | | |
|---|---|---|---|
| 3,457,800 | 7/1969 | Toshida et al. | 74/492 |
| 3,468,182 | 9/1969 | Shwartzberg | 280/777 |
| 3,827,710 | 8/1974 | Connell et al. | 180/78 |
| 4,363,499 | 12/1982 | Watanabe et al. | 280/775 |

*Primary Examiner*—Paul N. Dickson
*Attorney, Agent, or Firm*—Birch, Stewart, Kolasch & Birch, LLP

[57] ABSTRACT

In a steering system, a shaft unit is rotatably supported by a dashboard via a bearing member. When a vehicle hits against something or another vehicle, the bearing member frees the shaft unit from the dashboard. The bearing member includes a bearing and two brackets holding front and rear sides of the bearing. One of the brackets is attached to the dashboard. The brackets are disengaged from each other by a load applied by the collision of the vehicle, thereby freeing the shaft unit from the dashboard. The dashboard does not prevent the steering wheel and the freed shaft unit from moving toward a front part of the vehicle when a driver hits against the steering wheel due to inertia.

11 Claims, 5 Drawing Sheets

FRONT ←——→ REAR

STEERING SYSTEM FOR VEHICLE

BACKGROUND OF THE INVENTION

1. Field of the Invention

This invention relates to a steering system for a vehicle, and more particularly to a steering system which can reliably damp out shocks applied when a vehicle runs into something or collides with another vehicle.

2. Description of the Related Art

A variety of steering systems have been known and are currently available. One example of a steering system comprises a steering shaft which is coupled to a steering wheel at one end, passes through a dashboard, and is connected to a steering gear box at the other end.

Such a steering system has been proposed in Japanese Patent Laid-Open Publication No. Hei 4-108,482. With this steering system, an intermediate shaft passes through a dashboard. A set plate is attached, via a bearing, to the dashboard at a position where the intermediate shaft passes through. This set plate is designed to be relatively less rigid so that it may be easily pushed toward a front part of the vehicle. Thus, a lower end of a steering column can be displaced without being disturbed by the dashboard when shocks are applied to the steering system. In other words, the set plate promotes displacement of the steering system toward the front part of the vehicle.

Such a set plate is designed to be easily deformed, but cannot completely free the intermediate shaft from the dashboard. Sometimes, the set plate may be deformed in such a manner that it may interfere with the intermediate shaft or the steering column, thereby obstructing the steering column from being displaced toward the front part of the vehicle. This means that shocks cannot be damped at a position where the steering column is made immovable.

Further, shocks caused by the deformed set plate may change a positional relationship between the steering column and the bearing, which would cause the bearing to interfere with the steering column. Thus, shocks cannot be damped at such a position.

To overcome the foregoing obstructions, the steering column of the conventional steering system is required to include a damper mechanism having high damping efficiency, which means that the vehicle would become more expensive.

Further, there is a possibility that a steering shaft angle may vary due to the foregoing obstructions. Therefore, if the vehicle is provided with an air bag system, a larger air bag has to be used to protect a driver, taking a variation of the steering shaft angle into consideration.

SUMMARY OF THE INVENTION

According to the present invention, there is provided a steering system for a vehicle, comprising: a shaft unit passing through a dashboard, and a bearing member for attaching the shaft unit to the dashboard. The shaft unit is coupled to a steering wheel and a steering gear box at opposite ends thereof. At the time of collision of the vehicle, the bearing member frees the shaft unit, and is freely movable with respect to the dashboard. Therefore, even when the dashboard is moved toward a rear side of the vehicle in such a case, the bearing member does not obstruct a steering column. It is not necessary to use a highly effective damper mechanism because no shocks are caused by the foregoing obstruction. Even when the dashboard is moved toward a rear side of the vehicle in such a case, this movement does not cause the bearing member to obstruct the steering column. Therefore, it is not necessary to use a highly effective damper mechanism besides the foregoing arrangement. Further, it is not necessary to provide a large air bag taking the variation of the steering shaft angle into consideration.

The bearing member includes a bearing and a bracket member. The shaft unit is easily attached to the dashboard via the bearing and the bracket member.

The bracket member includes a member capable of being deformed and freeing the bearing from the dashboard when the dashboard and the shaft unit are relatively deformed at the time of collision of the vehicle. In such a case, the shaft unit does not follow the movement of the dashboard, remains free to move, and does not interfere with other members.

The bracket member includes a first bracket attached to the dashboard and supporting the bearing at a side confronting the rear of the vehicle, and a second bracket attached to the first bracket and supporting the bearing at a side confronting the front of the vehicle. The shaft unit can be easily attached to and detached from the brackets.

The first and second brackets are fastened to each other at portions which deviate from the bearing member with respect to a widthwise direction of the vehicle. If shocks are applied to the immovable bearing member via an immovable steerig gear box and the dashboard is made to move at the time of collision, a load is applied to the positions where the first and second brackets are fastened. Thus, these brackets can easily disengaged from each other at such positions.

The second bracket is smaller than the first bracket with respect to a longitudinal direction of the shaft unit. In other words, the second bracket is made less rigid than the first bracket. At the time of collision, the second bracket will be easily deformed, which facilitates its disengagement from the first bracket.

The first and second brackets are coupled at two positions using a bolt and an engaging member. Thus, the bearing can be easily detached from these brackets.

The second bracket is fastened to the first bracket by engaging the engaging member of the second bracket in an opening of the first bracket. These brackets can be easily fastened with each other.

A ball bearing is used to support the shaft unit in a rotatable manner even when the shaft unit swings during its rotation.

The shaft unit includes three shafts which are coupled via universal joints. The universal joints enable the shafts to be freely displaced therein, so that the shafts can be disposed in a collapsible manner. Therefore, shocks applied via a steering gear box can be damped by displacing the shafts via the universal joints. Such shocks are substantially prevented from being transmitted to the steering wheel. Further, if the driver hits against the steering wheel, the steering wheel can maintain its stroke in an axial direction of the shaft unit.

A damper mechanism is used in addition to the foregoing arrangement to attach the shaft unit to the dashboard via the bearing member which will be freed in response to a load applied at the time of collision.

The bearing member has an elastic rubber for supporting the shaft unit in a rotatable manner. This supporting member is easy to manufacture and inexpensive.

Further, according to the invention, there is provided a steering system for a vehicle, comprising: a shaft unit passing through a dashboard; an opening on the dashboard through which the shaft unit passes; an elastic cover attached to the dashboard so as to cover the opening thereon; a ball bearing located in a hole of the elastic cover; a first bracket attached to a peripheral edge of the opening on the dashboard; and a second bracket engaged with the first bracket. The shaft unit is coupled to a steering wheel and a steering gear box at opposite ends thereof. The ball bearing supports the shaft unit in a rotatable manner. The elastic cover has the hole at a center thereof. The first bracket supports the ball bearing at a side confronting a rear part of the vehicle. The second bracket supports the ball bearing at another side confronting a front part of the vehicle. Thus, the first and second brackets include portions by which the brackets are engaged and which are capable of being deformed and freeing the ball bearing and the shaft unit at the time of collision of the vehicle. The opening of the dashboard is covered by the elastic cover, so noises can be substantially cut off. Further, the shaft unit can be freely movable when a load is applied at the time of collision.

The shaft unit includes a plurality of shafts which are coupled via universal joints. Even if a load is applied to the steering system at the time of collision, the shaft unit can move with a large stroke. Further, the shaft unit is detachably attached to the dashboard using a ball bearing and the brackets. Therefore, the shaft unit is rotatably supported by the ball bearing.

The ball bearing is annular, and the first and second brackets have semi-arc portions for receiving the ball bearing therein. The ball bearing is sandwiched between the first and second brackets, and then these brackets are fastened to each other at two positions which deviate from the ball bearing in a widthwise direction of the vehicle. Specifically, the second bracket is fastened to the first bracket using a blot at one position, and using an engaging member at the other position. The brackets can be easily assembled using the engaging member. If a load is applied due to the collision, the brackets can be easily disengaged at the position where the engaging member is used.

BRIEF DESCRIPTION OF THE DRAWINGS

The present invention will become fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
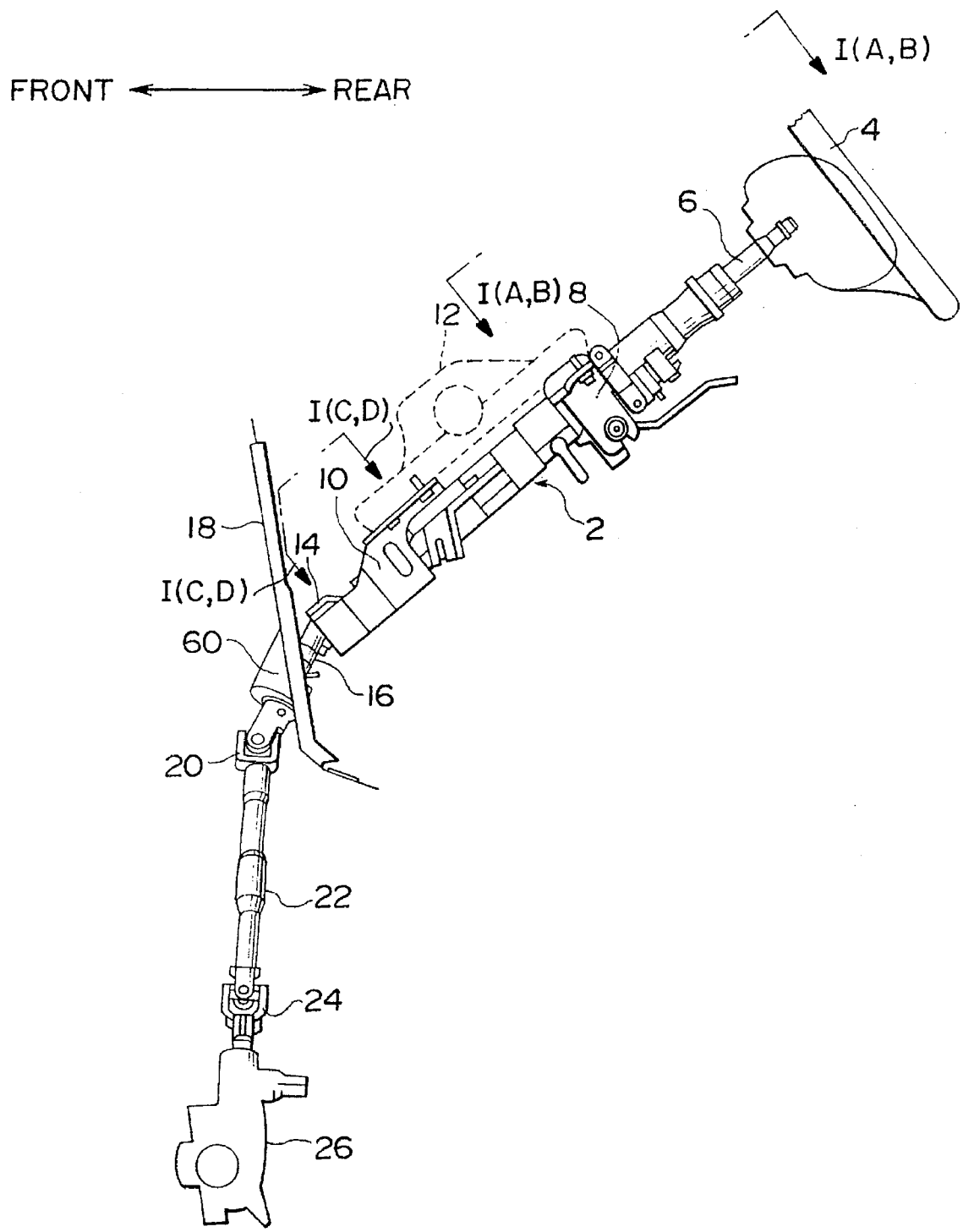
FIG. 1 is a schematic view showing the configuration of a steering system according to an embodiment of the invention.

A steering system according to one embodiment of the present invention is configured as shown in FIG. 1. A steering column 2 houses a steering shaft 6 (a first shaft) such that the steering shaft 6 is rotatable. The steering shaft 6 includes a shaft member and a pipe. The steering column 2 includes an upper bracket 8 and a lower bracket 10 at its opposite ends, respectively. Both of the upper and lower brackets 8, 10 are fixed to a column support member 12 laterally attached to a vehicle body.

Figure 1A:
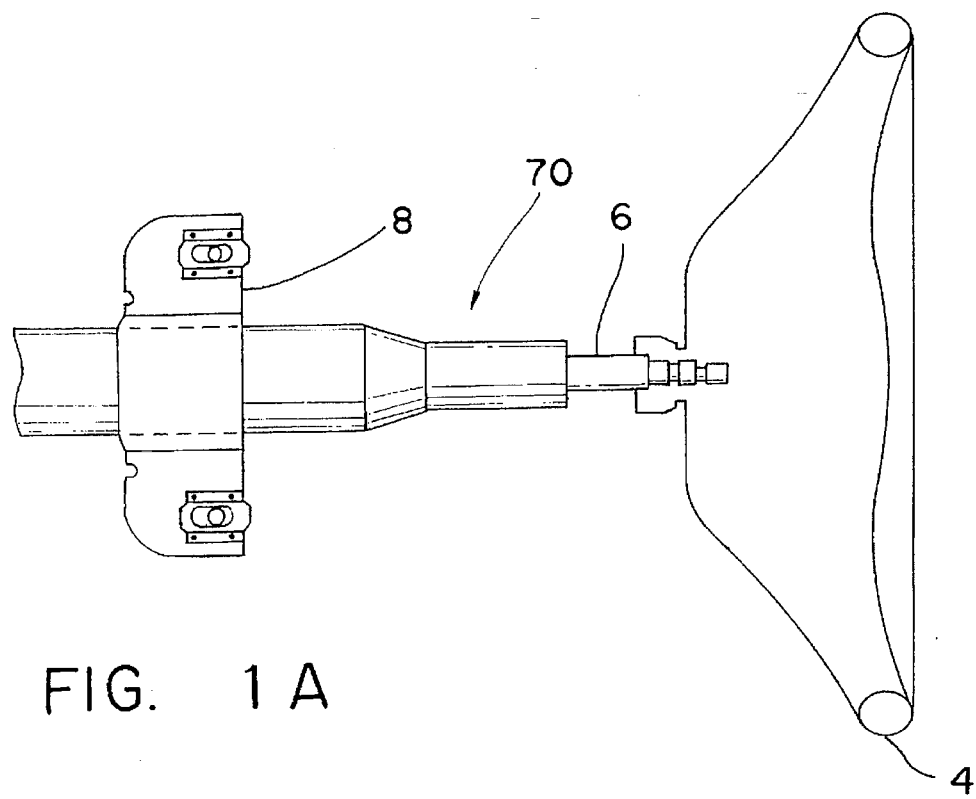
FIGS. 1A and 1B schematically show a cross-section of damper mechanism 70 along section lines I (A,B)—I (A,B), before and after collision load application, respectively.
Figure 1B:
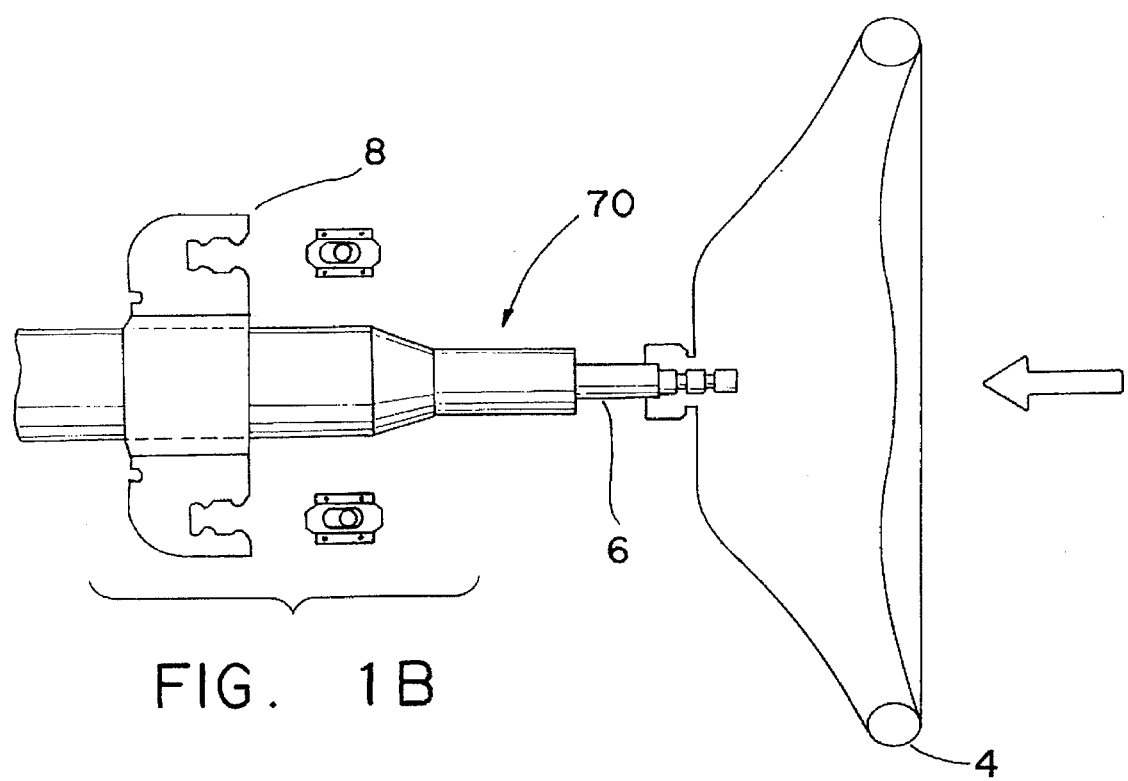
Figure 1C:
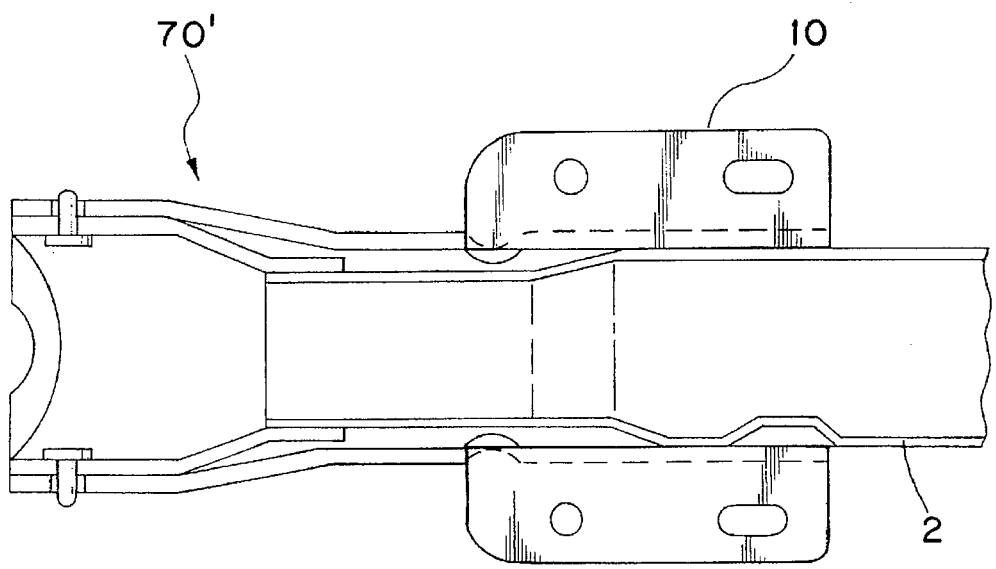
FIGS. 1C and 1D schematically show a cross-section of damper mechanism 70' along section lines I (C,D)—I (C,D), before and after collision load application, respectively.
Figure 1D:
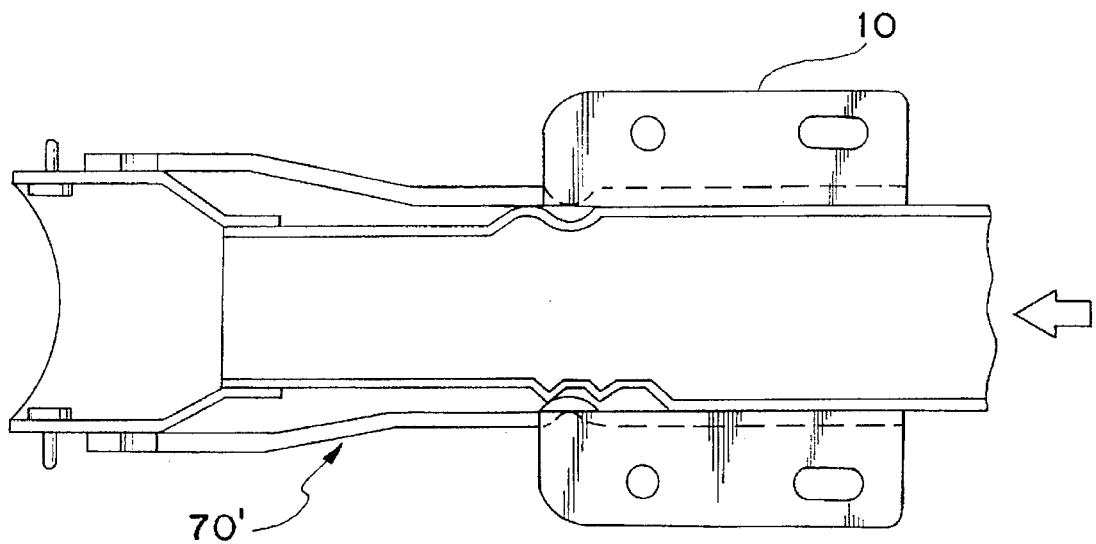

The steering system includes a well-known collapsible damper mechanism two types 70 and 70' as shown in FIGS. 1 through 1D. If a driver hits against the steering wheel 6 and a load (arrow) is applied thereto, the shaft member of the steering shaft is pushed into the pipe and becomes shorter so as to damp the load (FIGS. 1A and 1B). This collapsible damper mechanism 70 is sometimes used together with an additional damper mechanism 70'. In the additional damper mechanism 70', a coupler between the upper bracket 8 and the column support 12, and a coupler between the lower bracket 10 and the steering column 2 are broken such that the steering column 2 is freed from the vehicle body and is pushed forward and downward. At the same time, a projection (not shown) of the lower bracket 10 deforms the steering column 2 so as to damp the load applied to the steering shaft 6 (FIGS. 1C and 1D).

The steering shaft 6 is connected, at its lower end, to an intermediate shaft 16 (a second shaft). The intermediate shaft 16 passes through a dashboard 18. The intermediate shaft 16 is coupled, at its lower end, to a transmission shaft 22 (a third shaft) via a cross joint 24. At its lower end, the transmission shaft 22 is coupled to a steering gear box 26. Thus, the steering system transmits the turning action of the steering wheel 4 to the steering gear box 26, thereby turning wheels.

Another collapsible damper mechanism is provided for the transmission shaft 22 so as to damp a load applied via the steering gear box 26, and prevent the steering column 2 from protruding toward the driver.

Figure 2:
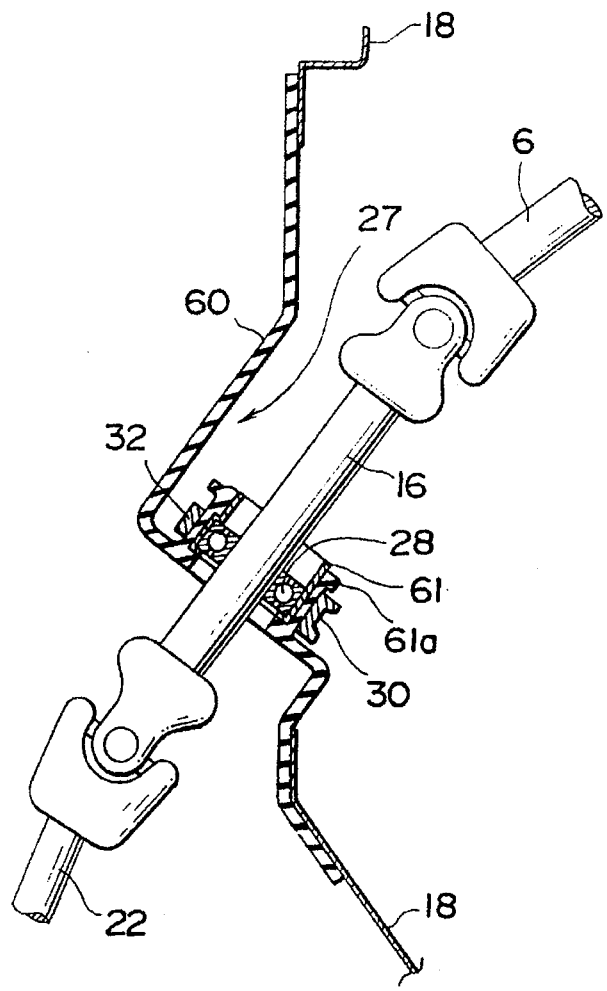
FIG. 2 is a partial cross section of a bearing member and a member for supporting a steering shaft via a dashboard, and a cover for sealing an opening on the dash panel.
Figure 7:
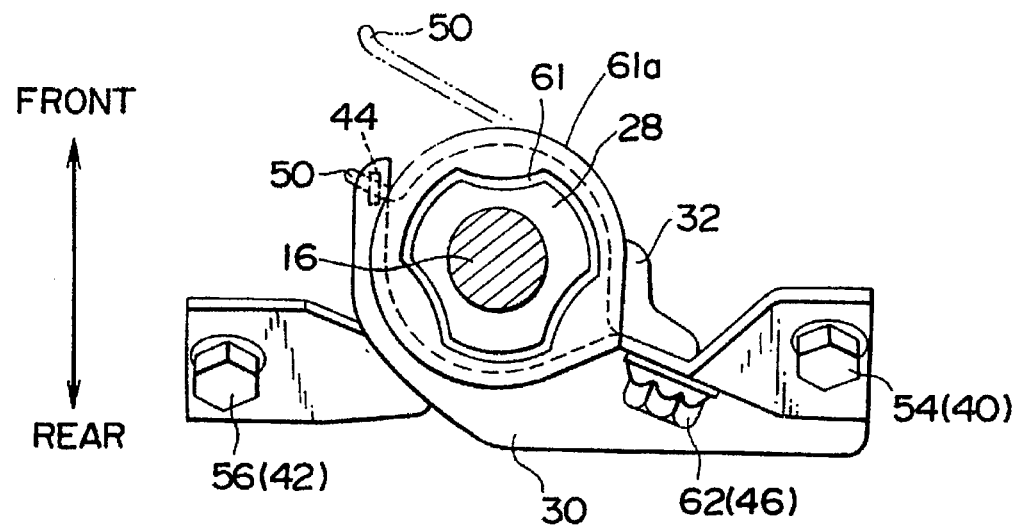
FIG. 7 is a schematic view of the bearing member, viewed in an axial direction of the steering shaft.

Referring to FIG. 2, the dashboard 18 has an opening 27 the intermediate shaft 16 passes through. The opening 27 is covered by a cover 60 made from an elastic material such as rubber. The cover 60 has a hole at its center the intermediate shaft 16 passes through. A ball bearing 28 is located at the center of the cover 60 so as to support the intermediate shaft 16 therein. The intermediate shaft 16 is rotatable in the ball bearing 28. The ball bearing 28 is annular in shape, and is housed in a retainer 61. Referring to FIG. 7, the retainer 61 is a round pipe and has three projecting portions at its top. The ball bearing 28 is in direct contact with the retainer 61 near a bottom, where an opening is formed so as to let the intermediate shaft 16 pass therethrough.

An outer surface of the retainer 61 is covered by the elastic cover 60 as shown in FIG. 2. The retainer 61 has a brim 61a along its top peripheral edge.

The retainer 61 is sandwiched, via the cover 60, between first and second brackets 30 and 32 as shown in FIG. 2. Specifically, the first and second brackets 30 and 32 are fastened to each other at two positions using a bolt an engaging member. In FIG. 2, the retainer 61 is shown as if it is supported by the dashboard 18 only via the elastic cover 60. The elastic cover 60 is not strong enough to hold the retainer 61 to the dashboard 18. In actual fact, the retainer 61 is supported by the dashboard 18 via the first bracket 30 which is fixedly attached to the dashboard 18.

Figure 3:
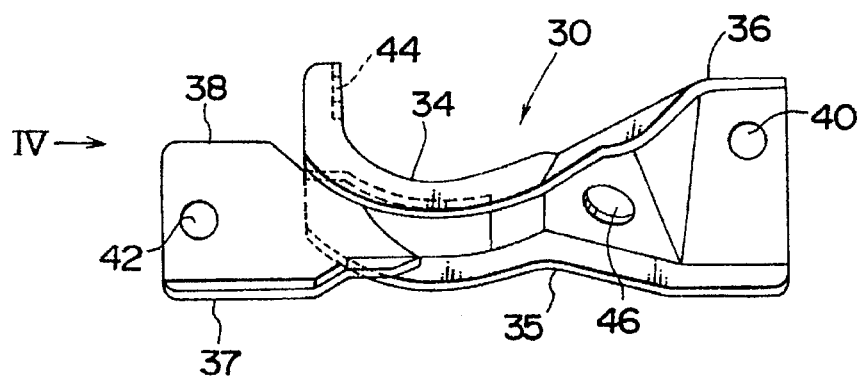
FIG. 3 is a perspective view of a first bracket constituting the bearing member.
Figure 4:
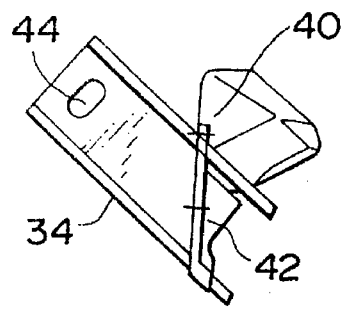
FIG. 4 is a schematic view showing the first bracket, viewed in a direction of an arrow IV shown in FIG. 3.

As shown in FIGS. 3 and 4, the first bracket 30 includes a body 35 having a semi-arc portion 34. The semi-arc portion 34 receives the ball bearing 28 therein, and has openings 44 and 46. The body 35 has a first attaching member 36 near the opening 46 of the semi-arc portion 34, and an auxiliary plate 37 welded thereto. A second attaching member 38 is present on a side across the semi-arc portion 34, i.e. the side opposite to the first attaching member 36. Both of the first and second attaching members 36 and 38 have openings 40 and 42, respectively.

Figure 5:
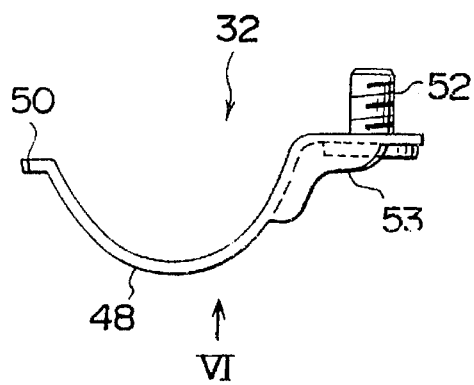
FIG. 5 is a front view of the second bracket constituting he bearing member.
Figure 6:
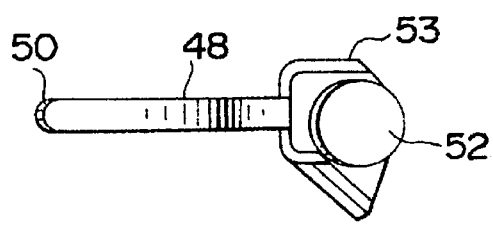
FIG. 6 is a schematic view showing the second bracket, viewed in a direction of an arrow VI shown in FIG. 5.

Referring to FIGS. 5 and 6, the second bracket 32 has a base 53 and a semi-arc portion 48 corresponding to the shape of the outer surface of the ball bearing 28. The semi-arc portion 48 has an engaging member 50 at its end opposite to the base 53. The base 53 has a bolt 52 welded thereon. The engaging member 50 will be engaged in the opening 44 of the first bracket 30. The bolt 52 will be inserted into the opening 46 of the first bracket 30. The semi-arc portion 48 and the engaging member 50 are smaller than the base 53 with respect to a longitudinal direction of the intermediate shaft 16. Further, the semi-arc portion 48 is narrower than the semi-arc member 34 of the first bracket 30. The engaging member 50 is chamfered at its edges.

The ball bearing 28 is supported in the first and second brackets 30 and 32 as shown in FIG. 7. The first bracket 30 is fixed to the dashboard 18 using bolts 54 and 56 inserted into the openings 40 and 42. The semi-arc portion 34 of the first bracket 30 supports a rear half of the ball bearing 28, and has an end extending forward. The opening 44 is formed in this extending end. The second bracket 32 receives the front half of the ball bearing 28 in its semi-arc portion 48 when the engaging portion 50 is engaged in the opening 44 of the first bracket 30. Then, the second bracket 32 is fastened to the first bracket 30 by screwing a nut 62 onto the bolt 52 which is inserted through the opening 46.

The first and second brackets 30 and 32 can reliably support the ball bearing 28 therebetween after the nut 62 is tightened. Specifically, the first and second brackets 30 and 32 are mutually fastened by the bolt 52 and the engaging member 50 (of the second bracket 32) which are inserted and engaged with the opening 46 and 44 (of the first bracket 30), respectively. The openings 46 and 44, the bolt 52 and the engaging member 50 are located at positions which are orthogonal to the running direction of the vehicle, and deviate from the ball bearing 28. The first bracket 30 is attached to the dashboard 18, which means that the ball bearing 28 is also supported by the dashboard 18.

The first and second brackets 30 and 32 are mutually fastened with a force which can disengage these brackets 30 and 32 when the dashboard 18 and the intermediate shaft 16 are relatively deformed due to collision.

When the dashboard 18 is pushed toward the rear part of the vehicle at the time of the collision (primary collision), the first bracket 30 fixed to the dashboard 18 tends to move with the dashboard 18. Further, the second bracket 32 bolted to the first bracket 30 also tends to move with the first bracket 30. However, according to the present invention, the second bracket 32 is prevented from moving backward because of the presence of the ball bearing 28 and the intermediate shaft 16. Tension acts on the portions where the first and second brackets 30 and 32 are engaged, thereby deforming the second bracket 32. Then, the engaging member 50 is disengaged from the opening 44 (as shown by a dashed line in FIG. 7), so the ball bearing 28 supporting the intermediate shaft 16 will be freed from the vehicle body.

When the collapsible damper mechanism 70 in the steering column 2 efficiently damps out the load applied by the driver hitting against the steering wheel 4 (secondary collision), the ball bearing 28 and the first and second brackets 30, 32 can protect the steering column 2 and the steering shaft 6 against displacement. Thus, the steering system can reliably protect the driver at the time of collision.

The second bracket 32 is easily deformed and is reliably disengaged from the first bracket 30 since the semi-arc portion 48 and engaging portion 50 of the second bracket 32 are narrower than the semi-arc portion 34 of the first bracket 30, and the engaging portion 50 is chamfered. In other words, the second bracket 32 serves as a deformable member for freeing the ball bearing 28 from the dashboard 18 due to a relative deformation which is caused between the dashboard 18 and the steering, intermediate or transmission shaft, at the time of collision.

The ball bearing 28 is supported by the vehicle body using the first and second brackets 30, 32 which are separable. Therefore, the ball bearing 28 can be easily attached and detached, and has a simple structure.

In the foregoing description, the ball bearing 28 is used so as to reliably support the intermediate shaft 19, which is coupled to the cross joints 14 and 20 at the opposite ends thereof, and is not only rotatable but also swingable. In the example shown in FIG. 1, if a single straight shaft is used in place of the steering shaft 6 and the intermediate shaft 16, and if it is rotatably supported via the dashboard 18, the number of cross joints to be used can be reduced, and the straight shaft is rotatable substantially without any swing. In this case, a cylindrical member made from elastic rubber such as ethylene-propylene rubber may be used in place of the ball bearing 28.

In the example shown in FIG. 2, the dashboard 18 has an opening whose size depends upon a possible displacement of the steering shaft 6 at the time of collision. The opening is covered by the cover 60 made of an elastic material. This cover 60 may be dispensed with in the structure shown in FIG. 2 if it is not necessary to cut off noise. In such a case, the retainer 61 seems as if it is floating in space. In actual fact, the retainer 61 is supported by the dashboard 18 via the first bracket 30.

The invention is not limited to the described embodiment. The first and second brackets may be engaged using a member made from a resin material which can be broken by a load larger than a predetermined value.

The invention being thus described, it will be obvious that the same may be varied in many ways. Such variations are not to be regarded as a departure from the spirit and scope of the invention, and all such modifications would be obvious to one skilled in the art are intended to be included within the scope of the following claims.

What is claimed is:

1. A steering system for a vehicle, comprising:

a) a shaft unit passing through a dashboard, the shaft unit being coupled to a steering wheel and a steering gear box at opposite ends thereof, and b) a bearing member for attaching the shaft unit to the dashboard and being capable of detaching the shaft unit from the dashboard at the time of collision of the vehicle, wherein the bearing member includes a bearing for supporting the shaft unit in a rotatable manner, and a bracket member for supporting the bearing and being attached to the dashboard, the bracket member including a first bracket attached to the dashboard and supporting the bearing at a side confronting a rear part of the vehicle, and a second bracket attached to the first bracket and supporting the bearing at a side confronting a front part of the vehicle, the second bracket capable of being disengaged from the first bracket at the time of collision and freeing the shaft unit from the dashboard.

2. The steering system according to claim 1, wherein the first and second brackets are fastened to each other at positions which are orthogonal to a running direction of the vehicle and deviate from the bearing.

3. The steering system according to claim 1, wherein the second bracket has a size smaller than the size of the first bracket with respect to a longitudinal direction of the shaft unit.

4. The steering system according to claim 1 or 2, wherein the first and second brackets are fastened to each other at two positions in a direction orthogonal to the running direction of the vehicle with the bearing sandwiched therebetween, and the brackets are bolted at one position and are engaged with each other at the other position.

5. The steering system according to claim 4, wherein the first and second brackets are fastened by engaging an engaging member of the second bracket in an opening of the first bracket.

6. The system according to claims 1, 2, 3, 4 or 5, further comprising a damper mechanism capable of reducing shock applied to the vehicle by collision.

7. A steering system for a vehicle, comprising:

a) a shaft unit passing through a dashboard, the shaft unit being coupled to a steering wheel and a steering gear box at opposite ends thereof;

b) an opening on the dashboard through which the shaft unit passes;

c) an elastic cover attached to the dashboard and being capable of covering the opening of the dashboard, the elastic cover having a hole at a center thereof;

d) a ball bearing located in the hole of the elastic cover, the ball bearing supporting the shaft unit in a rotatable manner;

e) a first bracket attached to a peripheral edge of the opening on the dashboard, the first bracket supporting the ball bearing at a side confronting a rear part of the vehicle; and f) a second bracket engaged with the first bracket, the second bracket supporting the ball bearing at another side confronting a front part of the vehicle;

whereby the first and second brackets include portions by which the brackets are engaged and which are capable of being deformed and freeing the ball bearing and the shaft unit at the time of collision of the vehicle.

8. The steering system according to claim 7, wherein the shaft unit includes a first shaft having a steering wheel at an upper end thereof, a third shaft coupled to a steering gear box at a lower end thereof via a universal joint, and a second shaft coupled to the first and third shafts via universal joints at opposite ends thereof, the second shaft being supported by the dashboard via the ball bearing and the first and second brackets.

9. The steering system according to claim 8, wherein the ball bearing is annular in shape, the first and second brackets have semi-arc portions for receiving the ball bearing therein, and the second bracket is fastened to the first bracket using a bolt at a position orthogonal to a running direction of the vehicle and is fastened to the first bracket using an engaging member at another position with the ball bearing sandwiched between the first and second brackets.

10. The steering system according to claim 9, wherein the second bracket is fastened to the first bracket by an engaging member of the second bracket in an opening of the first bracket.

11. The steering system according to claim 7 or 8, further comprising a damper mechanism capable of reducing shock applied to the vehicle by collision.

* * * * *